United States Patent [19]

Katayama

[11] Patent Number: 5,748,294
[45] Date of Patent: May 5, 1998

[54] OPTICAL-AXIS ADJUSTING DEVICE FOR A VEHICLE LIGHT RADAR SERVICE

[75] Inventor: Koji Katayama, Tokyo, Japan

[73] Assignee: Mitsubishi Denki Kabushiki Kaisha, Tokyo, Japan

[21] Appl. No.: 626,326

[22] Filed: Apr. 2, 1996

[30]     Foreign Application Priority Data

Oct. 13, 1995 [JP] Japan .................................. 7-265737

[51] Int. Cl.⁶ .................. B60T 7/16; E04G 3/00; G01C 3/08; G01B 11/26
[52] U.S. Cl. .................. 356/4.01; 180/169; 248/279.1; 356/138.1
[58] Field of Search .................. 356/3.01–5.15, 356/138.1; 180/169; 248/274.1, 276.1, 279.1

[56]     References Cited

U.S. PATENT DOCUMENTS

| | | |
|---|---|---|
| 3,762,820 | 10/1973 | Zoot et al. . |
| 3,877,157 | 4/1975 | Ashford et al. . |
| 5,090,805 | 2/1992 | Stawarz . |
| 5,099,112 | 3/1992 | Kamitani et al. ................. 250/201.6 |
| 5,359,499 | 10/1994 | Denley . |
| 5,661,551 | 8/1997 | Yamabuchi ......................... 356/5.01 |

FOREIGN PATENT DOCUMENTS

| | | |
|---|---|---|
| 5026237 | 3/1975 | Japan . |
| 555205 | 7/1993 | Japan . |

*Primary Examiner*—Stephen C. Buczinski
*Attorney, Agent, or Firm*—Sughrue, Mion, Zinn, Macpeak & Seas, PLLC

[57]     ABSTRACT

Disclosed herein is an optical-axis adjusting device for a vehicle light radar device where a light-transmitting window for irradiating a beam of light to an object of measurement and a light-receiving window for receiving reflected light from the object are disposed. The optical-axis adjusting device comprises an adjusting unit provided at the front of the light radar device for adjusting the irradiating direction of the beam of light.

5 Claims, 3 Drawing Sheets

OPTICAL-AXIS ADJUSTING DEVICE FOR A VEHICLE LIGHT RADAR SERVICE

BACKGROUND OF THE INVENTION

1. Field of the Invention

The present invention relates to an optical-axis adjusting device for adjusting an irradiating direction of a light beam in a vehicle light radar device where a light beam is irradiated from a light-emitting source to an object of measurement, then the light reflected by the object is received, and a distance to the object is detected.

2. Description of Related Art

A conventional vehicle light radar device is known, for example, in Japanese Utility Model Laid-Open No. 5-55205. In this vehicle light radar device, a light beam is irradiated from a light-emitting source, then the reflected light from an object of measurement is received, and based on the relationship between the light transmission signal and the light reception signal, the distance to an object can be detected. The vertical and lateral adjustments of the light beam (optical axis) are made by performing the directional adjustment and the fixing operation of the beam transmitter-receiver. The vehicle light radar device is equipped with an adjusting device where the directional adjustment can be made from one direction.

An adjusting device such as that shown in FIG. 7 is known as another device for adjusting a direction of a light beam. In FIG. 7, a vehicle light radar device 1 is fixed at the opposite side surfaces thereof to a bracket 50 by means of screws 51 and 52. These screws 51 and 52 are spaced by a predetermined distance, and the slot 52a of the bracket 50 on the side of the screw 52 is formed into the shape of a circular arc with the screw 51 as a center. The vertical adjustment of the irradiating direction of the light beam of the vehicle light radar device 1 is performed by adjusting the fixed position of the screw 52 with respect to the circular arc-shaped slot 52a.

The bracket 50 is fixed to a plate 53 by means of fixation screws 54 and 55 and is attached to the vehicle through the plate 53. For the screws 54 and 55 for fixing the bracket 50 to the plate 53, the slot 55a of the plate 53, through which the screw 55 is inserted, is formed into the shape of a circular arc with the screw 54 as a center. The lateral adjustment of the irradiating direction of the light beam of the vehicle light radar device 1 is performed by adjusting the fixed position of the screw 55 with respect to the circular arc-shaped slot 55a.

The adjustment of the irradiating direction (optical axis) of the light beam of the vehicle light radar device needs to be performed after the light radar device is mounted on a vehicle. In a conventional vehicle light radar device such as described above, as shown in the mechanism of Japanese Utility Model Laid-Open No. 5-55205 or the mechanism of FIG. 7, the adjustment of the irradiating direction of the light beam is performed from the side surface positioned rearwardly of the device with respect to the front surface of the device, or from the upper surface or lower surface direction. For this reason, when mounting the vehicle light radar device on the vehicle, it becomes necessary to have an adjusting space for making an adjustment with respect to each of the surfaces. The necessity of this space becomes a large limitation when mounting the vehicle light radar device on the vehicle, and consequently, there is the problem that the ability of mounting the device on a vehicle is reduced.

Also, the adjusting device, shown in Japanese Utility Model Laid-Open No. 5-55205, has the disadvantage that the stability in the beam direction cannot be obtained due to the vibration caused by the traveling of a vehicle, because the fulcrum shaft is loose in the axial direction.

BRIEF SUMMARY OF THE INVENTION

An objective of the present invention is to provide an optical-axis adjusting device for a vehicle light radar device which is capable of enhancing the mounting ability to a vehicle by making an adjustment of an optical axis and a fixation after adjustment from the side originally having space where a light beam of the vehicle light radar device is irradiated.

Another objective of the present invention is to provide an optical-axis adjusting device for a vehicle light radar device which is capable of eliminating looseness caused by the traveling vibration of a vehicle and obtaining stability in the beam direction.

To achieve the foregoing objectives and in accordance with an important aspect of the present invention, there is provided an optical-axis adjusting device for a vehicle light radar device which has a light-transmitting window for irradiating a beam of light to an object of measurement and a light-receiving window for receiving reflected light from said object, the optical-axis adjusting device, comprising adjusting means provided at the front of said light radar device for adjusting the irradiating direction of said beam of light.

With this arrangement, an adjustment and a fixation after adjustment can be made from the front side of the device where the light-transmitting window and the light-receiving window are disposed, and consequently, limitations on the mounting of the apparatus on a vehicle are considerably reduced.

In a preferred form of the invention, said adjusting means comprises adjustment screws for vertically and laterally rotating and adjusting the irradiating direction of said beam of light and fixation screws for maintaining a position adjusted by means of said adjustment screws.

With this arrangement, an adjustment and a fixation after adjustment can be made from the front side of the device where the light-transmitting window and the light-receiving window are disposed, and consequently, limitations on the mounting of the apparatus on a vehicle are considerably reduced.

In another preferred form of the invention, said fixation screws comprises vertical fixation screws for maintaining a position adjusted in a vertically rotated direction, the vertical fixation screws being disposed on a horizontal plane connecting vertical rotation fulcrums together, and a lateral fixation screw for maintaining a position adjusted in a laterally rotated direction, the lateral fixation screw being disposed on a plane which passes through a lateral rotation fulcrum and is substantially parallel to the irradiating direction of said beam of light.

With this arrangement, an adjustment and a fixation after adjustment can be made from the front side of the device where the light-transmitting window and the light-receiving window are disposed, and consequently, limitations on the mounting of the apparatus on a vehicle are considerably reduced.

In still another preferred form of the invention, the optical-axis adjusting device further comprises a first member fixed directly to said vehicle light radar device, a second member fixed directly to a vehicle, a third member provided between said first and second members, the third member constituting a rotation fulcrum portion which vertically and laterally rotates said first member with respect to said second member, and an elastic press member for pressing said first and second members together in the vicinity of said rotation fulcrum portion.

With this arrangement, the first and second members are pressed together by the elastic member with a force that can sufficiently stand the traveling vibration of a vehicle. As a result, the looseness of the fulcrum portion is eliminated, the influence of the traveling vibration on the beam of light is eliminated, and stability in the beam direction can be assured even during traveling.

In a further preferred form of the invention, the optical-axis adjusting device according to claim 5 further comprises a press mechanism for pressing said first and second members together, the press member being disposed concentrically of said lateral rotation fulcrum of said rotation fulcrum portion.

With this arrangement, the first and second members are pressed together at points other than the fulcrum portion and therefore the rigidities of the members are increased and the members can be made thinner. As a result, an optical-axis adjusting device, which is light in weight and low in cost, is obtainable.

BRIEF DESCRIPTION OF THE DRAWINGS

The above and other objects and advantages will become apparent from the following detailed description when read in conjunct ion with the accompanying drawings wherein.

DETAILED DESCRIPTION OF THE PREFERRED EMBODIMENTS

Figure 1:
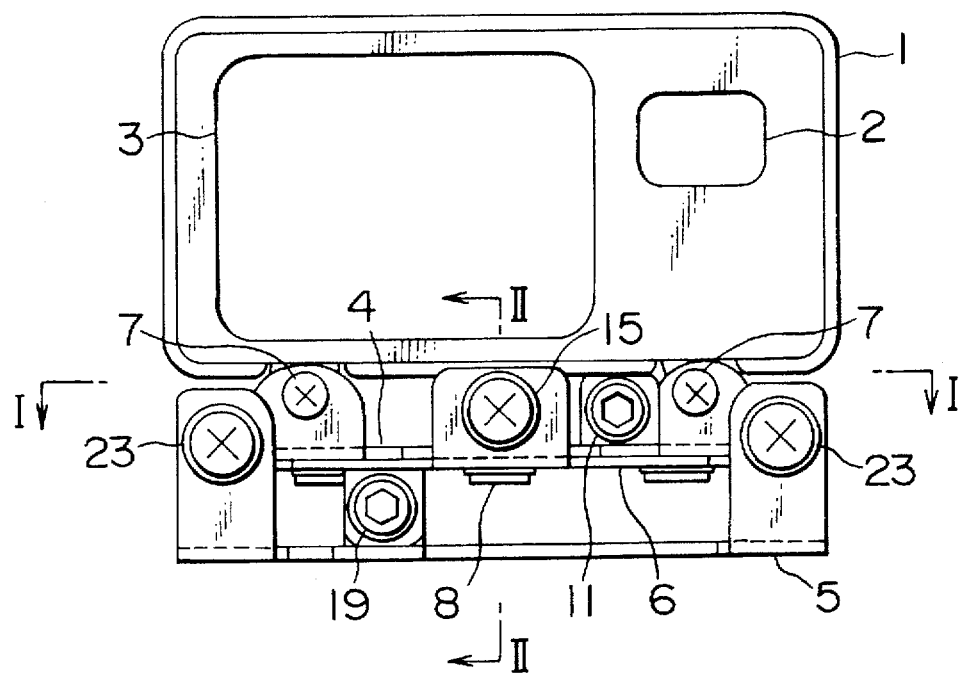
FIG. 1 is a front view showing an embodiment of an optical-axis adjusting device for a vehicle light radar device of the present invention.
Figure 2:
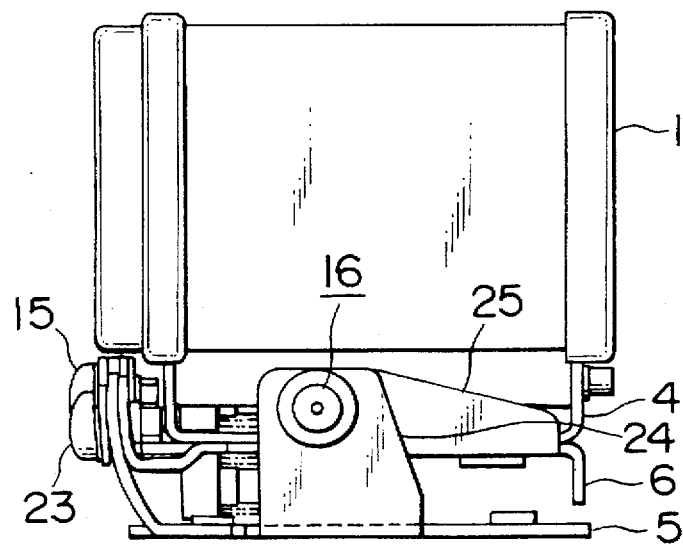
FIG. 2 is a side view showing the embodiment in FIG. 1 of the present invention.

A preferred embodiment of the present invention will hereinafter be described with reference to the drawings. In FIGS. 1–6, a vehicle light radar device 1 is equipped with a light-transiting window 2 and a light-receiving window 3 at the front surface thereof. The vehicle light radar device 1 is attached at its bottom portion to an upper plate 4, which in turn is attached to a lower plate 6. The lower plate 6 is attached to a bottom plate 5 attached to the vehicle.

The vehicle light radar device 1 is fixed to the upper plate 4 by means of screws 7. The upper and lower plates 4 and 6 are relatively rotatable about a fulcrum 8 in the lateral direction of the device 1. For this reason, the upper plate 4 is provided integrally with a first projection 9 having a female screw. The lower plate 6 is provided integrally with a first projection 10 having a U-shaped groove, and the first projection 10 of the lower plate 6 pairs with the first projection 9 of the upper plate 4. An adjustment screw 11 is screwed into the female screw of the projection 9 of the upper plate 4 and is provided with a groove 11a which engages with the U-shaped groove of the projection 10 of the lower plate 6.

In addition, the adjustment screw 11 is urged in one direction by means of a spring 12. The upper plate 4 is further provided integrally with a second projection 13 having a female screw, formed into the shape of a circular arc with the fulcrum 8 as a center. The lower plate 6 is further provided integrally with a second projection 14 which pairs with the projection 13 of the upper plate 4. The second projection 14 of the lower plate 6 has a laterally elongated slot, which is formed into the shape of a circular arc with the fulcrum 8 as a center. These projections 13 and 14 are fixed with each other by means of a screw 15 screwed into the female screw provided in the projection 13 of the upper plate 4.

The lower plate 5 and the bottom plate 6 are relatively rotatable about a fulcrum 16 in the vertical direction of the device 1. For this reason, the lower plate 6 is provided integrally with a third projection 17 having a female screw, while the bottom plate 5 is provided integrally with a first projection 18 which has a U-shaped groove so as to pair with the third projection 17. An adjustment screw 19, urged into one direction by means of a spring 20, is screwed into the female screw of the projection 17 of the lower plate 6 and is provided with a groove 19a which engages with the U-shaped groove of the first projection 18 of the bottom plate 5.

In addition, the lower plate 6 is provided integrally with a fourth projection 21 having a female screw, and the projection 21 is formed into the shape of a circular arc with the fulcrum 16 as a center. That is, the projection 21 is curved in the vertical direction so that the lower plate 5 and the bottom plate 6 are relatively rotatable about the fulcrum 16 in the vertical direction. Likewise, the bottom plate 5 is provided integrally with a second projection 22 so that the projection 22 pairs with the projection 21 of the lower plate 6. The second projection 22 of the bottom plate 5 has a vertical slot and is formed into the shape of a circular arc with the fulcrum 16 as a center. These projections 21 and 22 are fixed together by means of a screw 23 screwed into the female screw provided in the projection 21 of the lower plate 6.

Figure 5:
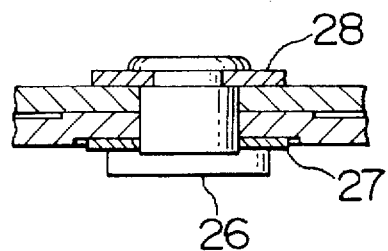
FIG. 5 is a sectional view of the embodiment in FIG. 3 taken substantially along line III—III of FIG. 3.

Furthermore, the bottom plate 5 is provided integrally with a third projection 24 constituting the fulcrum 16, while the lower plate 6 is provided integrally with a fifth projection 25 constituting the fulcrum 16. The fulcrum shaft of the fulcrums 8 and 16 is shown in FIG. 5 as 26. An elastic spring 27 is fitted on the fulcrum shaft 26 so that the plates 4 and 6 are clamped together. In addition, a washer 28 is inserted on the fulcrum shaft 26 and undergoes the reaction force of the spring 27.

The upper plate 4 and the lower plate 6 are relatively movable on a concentrical circle of the fulcrum 8. For this reason, an oblique slot 29 is formed in the upper plate 4, and a hole 30 is formed in the lower plate 6 so as to pair with the slot 29. Also, a pin 31 is inserted into the hole 30 and the slot 29. An elastic spring 32 is inserted on the pin 31 so that the plates 4 and 6 are clamped together. A washer 33 is also inserted on the pin 31 and undergoes the reaction force of the spring 32 at the slot side.

Now, the operation will be described with reference to FIGS. 1 and 6. The vehicle light radar device 1 irradiates a predetermined beam of light from the light transmitting window 2. The light beam irradiated from the light-transmitting window 2 is reflected by an object of measurement and then returns to the light-receiving window 3. A distance to the object is obtained from the relationship between the light transmission signal and the light reception signal at this time.

This vehicle light radar device 1 is fixed to the plate 4 by the screws 7 and is attached to the vehicle through the plates 6 and 5. When attaching the device 1 to the vehicle, it is necessary to adjust the orientation of the device 1 so that the light beam irradiated from the light transmitting window 2 is accurately irradiated to the range of the object of measurement.

Initially, the lateral adjustment of the vehicle light radar device 1 will be described based on FIGS. 3 and 4. The screw 15 is loosened before adjustment. Then, if the adjustment screw 11 is rotated so as to be screwed into the female screw of the projection 9 of the upper plate 4, the groove 11a of the adjustment screw 11 will be moved in a direction away from the projection 9 of the upper plate 4. Then, the projection 10 of the lower plate 6 having a U-shaped groove engaged by the groove 11a is caused to rotate about the fulcrum 8 in the direction away from the projection 9 of the upper plate 4.

If, on the other hand, the adjustment screw 11 is rotated so as to be unscrewed from the female screw of the projection 9 of the upper plate 4, then the groove 11a of the adjustment screw 11 will be moved in the direction toward the projection 9 of the upper plate 4. Then, the projection 10 of the lower plate 6 having a U-shaped groove engaged by the groove 11a is caused to rotate about the fulcrum 8 in the direction toward the projection 9 of the upper plate 4.

The upper plate 4, therefore, laterally or horizontally rotates about the fulcrum 8 with respect to the lower plate 6, depending upon the direction of rotation of the adjustment screw 11. In this way, the position of the vehicle light radar device 1 is adjusted so that the light beam from the light transmitting window 2 of the device 1 can be accurately irradiated to the lateral range of the object of measurement. Thus, if the lateral or horizontal position of the vehicle light radar device 1 is determined, then the screw 15 will be tightened to fix the upper and lower plates 4 and 6 together through the projections 13 and 14.

Next, the vertical adjustment of the vehicle light radar device 1 will be described based on FIGS. 3 and 4.

First, the screws 23 are loosened before adjustment. Then, if the adjustment screw 19 is rotated so as to be screwed into the female screw of the projection 17 of the lower plate 6, the groove 19a of the adjustment screw 19 will be moved in the direction away from the projection 17 of the lower plate 6. Then, the projection 18 of the bottom plate 5 having a U-shaped groove engaged by the groove 19a is caused to rotate about the fulcrum 16 in the direction away from the projection 17 of the lower plate 6.

If, on the other hand, the adjustment screw 19 is rotated so as to be unscrewed from the female screw of the projection 17 of the lower plate 6, then the groove 19a of the adjustment screw 19 will be moved in the direction toward the projection 17 of the lower plate 6. Then, the projection 18 of the bottom plate 5 having a U-shaped groove engaged by the groove 19a is caused to rotate about the fulcrum 16 in the direction toward the projection 17 of the lower plate 6.

The lower plate 6, therefore, vertically rotates about the fulcrum 16 with respect to the bottom plate 5, depending upon the direction of rotation of the adjustment screw 19. In this way, the position of the vehicle light radar device 1 is adjusted so that the light beam from the light transmitting window 2 of the device 1 can be accurately irradiated to the vertical range of the object of measurement.

Thus, if the vertical position of the vehicle light radar device 1 is determined, then the screws 23 will be tightened to fix the lower and bottom plates 6 and 5 together through the projections 21 and 22. In this way, the lateral and vertical adjustments and the fixing after the adjustments can be performed from the front side of the device 1 where the light-transmitting window 2 and the light-receiving window 3 are disposed, and consequently, the limitations on the mounting of the device on a vehicle can be considerably reduced.

In addition, with the pressing force of the spring 27, the plates 4 and 6 in the vicinity of the fulcrum 8 are pressed together and the plates 6 and 5 in the vicinity of the fulcrum 16 are pressed together, as shown in FIG. 5. The pressing force of the spring 27 is set so that the vibration caused by the traveling of a vehicle can be sufficiently absorbed, the vehicle light radar device 1 can be stably supported, and the irradiating direction can be stabilized.

Figure 3:
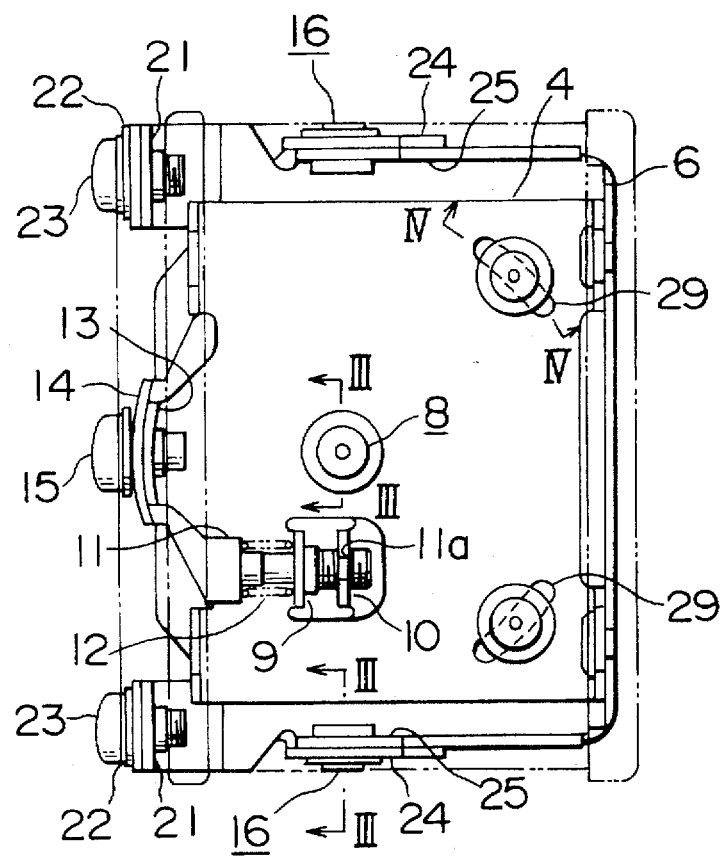
FIG. 3 is a sectional view of the embodiment in FIG. 1 taken substantially along line I—I of FIG. 1.
Figure 4:
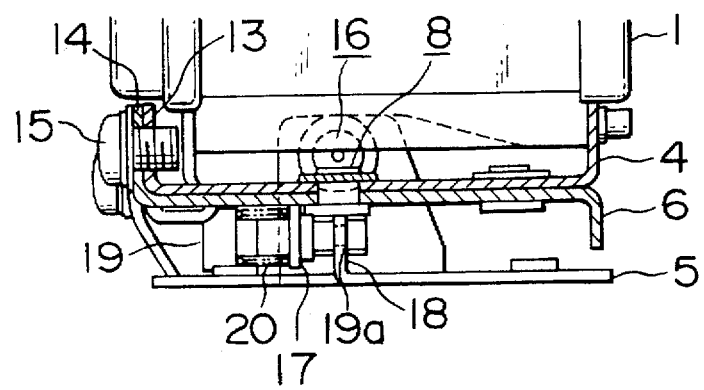
FIG. 4 is a sectional view of the embodiment in FIG. 1 taken substantially along line II—II of FIG. 1.
Figure 6:
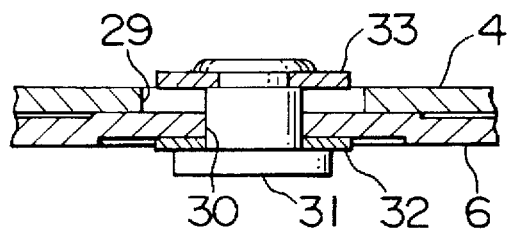
FIG. 6 is a sectional view of the embodiment in FIG. 3 taken substantially along line IV—IV of FIG. 3.
Figure 7:
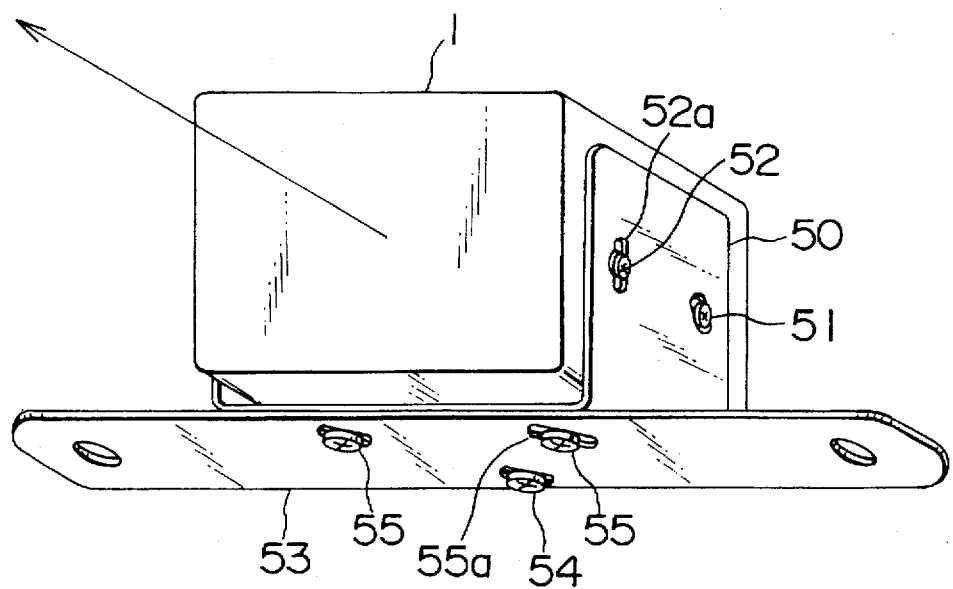
FIG. 7 is a perspective view showing a conventional device.

Furthermore, as shown in FIGS. 3 and 6, the plates 4 and 6 in the vicinity of the fulcrum 8 are pressed together concentrically with respect to the fulcrum 8 with a predetermined force by the spring 32. Consequently, the rigidities of the plates 4 and 6 are enhanced, the vehicle light radar device 1 is stably supported, and the irradiating direction is stabilized.

While the present invention has been described with relation to the preferred embodiment, various modifications and adaptations thereof will now be apparent to those skilled in the art. All such modifications and adaptations as fall within the scope of the appended claims are intended to be covered thereby.

What is claimed is:

1. An optical-axis adjusting device for a vehicle light radar device which has a light-transmitting window for irradiating a beam of light to an object of measurement and a light-receiving window for receiving reflected light from said object, said optical-axis adjusting device comprising:

vertical adjusting means provided at a front of said light radar device for adjusting a vertical irradiating direction of said beam of light; and lateral adjusting means provided at the front of said light radar device for adjusting a lateral irradiating direction of said beam of light.

2. An optical-axis adjusting device as set forth in claim 1, wherein said vertical adjusting means comprises a vertical adjustment screw for vertically rotating and adjusting the vertical irradiating direction of said beam of light, and vertical fixation screws for maintaining a vertical position adjusted by means of said vertical adjustment screw; and wherein said lateral adjusting means comprises a lateral adjustment screw for laterally rotating and adjusting the lateral irradiating direction of said beam of light, and a lateral fixation screw for maintaining a lateral position adjusted by means of said lateral adjustment screw.

3. The optical-axis adjusting device as set forth in claim 2, wherein the vertical fixation screws are disposed in a horizontal plane connecting vertical rotation fulcrums together, and the lateral fixation screw is disposed in a plane which passes through a lateral rotation fulcrum and is substantially parallel to the irradiating direction of said beam of light.

4. The optical-axis adjusting device as set forth in claim 1, further comprising:
- a first member fixed directly to said vehicle light radar device;
- a second member fixed directly to a vehicle;
- a third member provided between said first and second members, the third member constituting a rotation fulcrum portion which vertically and laterally rotates said first member with respect to said second member; and
- an elastic presser member for pressing said first and second members together in the vicinity of said rotation fulcrum portion.

5. The optical-axis adjusting device as set forth in claim 4, further comprising a pressing mechanism for pressing said first and second members together, the presser member being disposed concentrically around said lateral rotation fulcrum of said rotation fulcrum portion.

* * * * *